United States Patent [19]

Willisch

[11] 4,317,671
[45] Mar. 2, 1982

[54] PROCESS OF COMPOSTING REFUSE OR REFUSE/SEWAGE SLUDGE MIXTURES BY THERMAL RETTING

[75] Inventor: Hannes Willisch, Pulheim, Fed. Rep. of Germany

[73] Assignee: von Roll AG, Gerlafingen/Schweiz, Fed. Rep. of Germany

[21] Appl. No.: 125,684

[22] Filed: Feb. 28, 1980

[30] Foreign Application Priority Data

Mar. 10, 1979 [DE] Fed. Rep. of Germany ........ 2909515
Jan. 17, 1980 [DE] Fed. Rep. of Germany ........ 3001508

[51] Int. Cl.³ .......................... C05F 7/00; C05F 9/04
[52] U.S. Cl. ............................................. 71/9; 71/13; 71/14
[58] Field of Search .................... 71/8, 9, 12, 13, 14

[56] References Cited

U.S. PATENT DOCUMENTS

| | | | |
|---|---|---|---|
| 2,595,027 | 4/1952 | Verdiev | 71/14 X |
| 4,146,381 | 3/1979 | Willisch et al. | 71/9 |
| 4,146,382 | 3/1979 | Willisch | 71/9 |

FOREIGN PATENT DOCUMENTS

| | | | |
|---|---|---|---|
| 2206408 | 8/1973 | Fed. Rep. of Germany | 71/9 |
| 2415068 | 11/1975 | Fed. Rep. of Germany | 71/9 |
| 2520762 | 11/1976 | Fed. Rep. of Germany | 71/12 |
| 2337116 | 7/1977 | France | 71/8 |
| 521894 | 6/1940 | United Kingdom | 71/9 |

*Primary Examiner*—Kenneth M. Schor
*Attorney, Agent, or Firm*—Diller, Ramik & Wight

[57] ABSTRACT

This disclosure relates to a novel process of composting refuse or refuse/sewage-sludge mixtures by thermal retting by piling refuse to form a first layer of a predetermined height, maintaining an area below the first layer accessible to atmosphere, and retaining the same under atmospheric conditions for a predetermined period of time until the same has solidified and become self-supporting through entanglement of the retted refuse, thereafter forming a second layer atop the first layer, maintaining the second layer under similar conditions for a similar predetermined period of time, and repeating such layering until a stack is formed, and thereafter removing the stack or portions thereof for further utilization only after the uppermost layer has become completely solidified and self-supporting through entanglement of its completely retted refuse.

23 Claims, 14 Drawing Figures

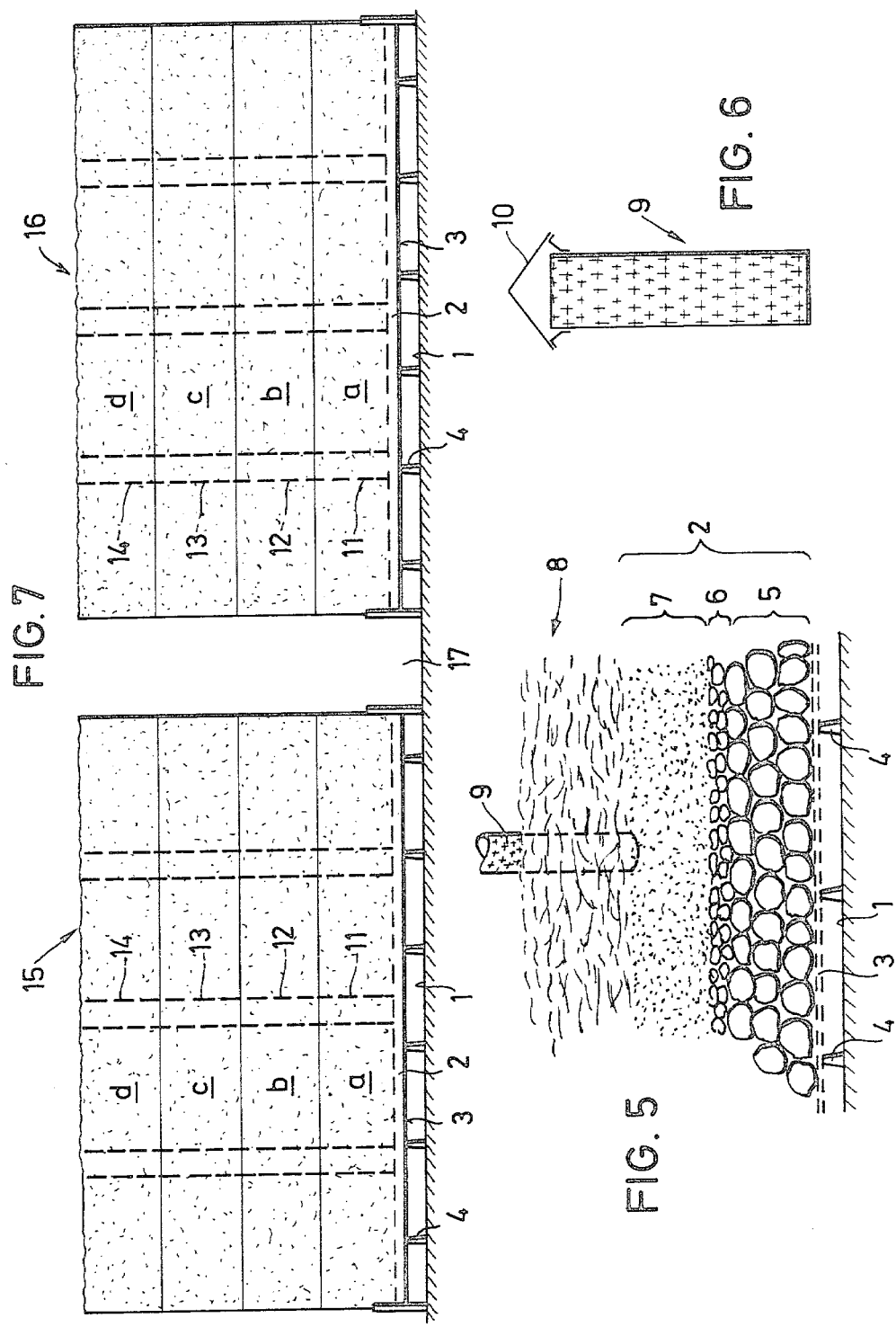

PROCESS OF COMPOSTING REFUSE OR REFUSE/SEWAGE SLUDGE MIXTURES BY THERMAL RETTING

The present invention is directed to a novel process of composting refuse or refuse/sewage-sludge mixtures by thermal retting by first comminuting the refuse and separating the non-compostable elements by a screening operation.

In order to achieve reliable composting of comminuted domestic or industrial waste by thermal retting, the waste material is generally subjected to a pretreatment. It has been known, for example, to add liquid to the refuse prior to its comminution because waste in general, and in particular domestic waste, contains about 25 to 40 percent by weight of water and the latter is not a sufficient water content for composting purposes. It is advantageous to use for composting a comminuted waste material which, with a humidity of about 45 to 55 percent by weight, has a bulk wight of 0.4 g/cm$^3$ and which for each brittle or soft material of the refuse, such as metal, wood, glass, ceramics, rubber, plastic, fabric, paper or the like in lumps or in flat form, has nearly the same granularity corresponding to a predetermined grain size. From the product which shall be smaller than about 15 mm, hard materials such as glass, metals, stones, fragments or the like may be separated directly by the screening heretofore noted, e.g., with the principal of an air separator. Thus, a homogeneous loose product capable of being ventilated and having a very low bulk weight and a great surface and pore volume is obtained. The product thus pretreated in this manner can be piled in a stack, preferably in a stack comprising longitudinally extending tunnel-shaped cavities. The pile may be relatively high, higher than about four meters, and there will be no compacting or wetness formed at the stack base because of the stacks own weight. Also, because of the free pore volume, the ambient air may penetrate from all sides through the piled material to effect thermal retting. The refuse material may accept and retain water without sticking. When the stack is piled, no further manipulation, such as forced ventilation, wetting, turning over, screening, after-crushing or air separating is required. The piled refuse is left as it is to final retting. Due to the low bulk weight and the free pore volume, the amount of air available to the piled product or refuse from the beginning of the retting operation may initiate a spontaneous reaction for retting and the formation of fungi through and to the termination of the retting or composting operation. The product must, of course, not be dehydrated during the latter and no anaerobic pockets may be formed in the stack which might bring about rotting. Obviously, no stacking is required.

After some time, the stack material is sufficiently stable after having become completely fungous or composted. As a result, the stack internally becomes self-supporting and uniformly absorbs and circulates a great amount of air at relatively low rates of circulation which is required for the odorless aerobic fermentation of refuse. The stack is completely free of manipulation, and it is storable up to basically an unlimited time in this form. The content of water will not decrease below the minimum for retting. The resulting compost is homogeneous, fine-grained and appears much like peat in its outer aspect. When the material has reached the desired maturity, it may be sold directly, without any further processing, to consumers for use in agriculture, intensive cultures, etc.

This method of composting is very reliable and in certain European areas it is independent of atmospheric conditions. The formation of relatively high stacks of refuse and retting thereof may be performed completely out of doors with rains, humidity, or like atmospheric conditions in such areas being ineffective to detract from the retting process. Rain is either absorbed or processed by the piled stack, or due to the heat formed in the retting process which may be as high as about 60° to 80° C. inside the stack, surplus moisture is simply converted into steam. The radiation of the sun in such European areas is not sufficient to dry out the stack and with relative unimpeded access to atmospheric air, the retting process is extremely reliable under most conditions of atmospheric temperature and moisture (rain). If necessary, conventional cavities may be provided beneath the pile of refuse in a conventional manner.

In other areas where atmospheric conditions of rain, sun, radiation or frost are excessively objectionable to the retting process, the invention is still effective to permit composting by still maintaining an undisturbed aerobic bacterial activity in the absence of the formation of pockets of rot to the complete hygienization of the material in stacks of relatively great heights without the formation therein of longitudinal cavities or through the utilization therewith of portable templates, forms, or the like. Thus, the invention may be practiced under extreme atmospheric conditions, such as extensive rainfall and/or strong sun radiation.

The invention is particularly characterized in that the prepared refuse is piled uniformly to form a layer of a predetermined height and maintaining access of atmospheric air thereto from below a lower surface of the layer and to vent the same generally vertically through fluelike vents with this layer being left for some time until the stack is self-supporting through its fungus texture. Thereafter, another layer of a predetermined uniformly distributed height is subsequently applied to the first layer and is again left as it is until it becomes internally solidified through the activity of fungi after which while maintaining the same process conditions additional layers may be built-up in the same manner, such that upon completion of the fungous texture or retting of the uppermost layer, only thereafter will the total pile of the layers be removed for subsequent utilization.

As a result of such consecutive piling of layers by maintaining specific prerequisites, the refuse material may be piled to heights which correspond to approximately five to six meters in composting processes of this type, and this can be done without the risk of the retting process failing. At the same time, the outline area of the stacks is utilized fully in the same manner. If the refuse material is piled up totally to its maximum height, it will become black very soon because without the provisions of mountings, free tunnels, channels, or flues in the stack of refuse, the supply of ambient air can not suffice for proper retting. However, as a result of the progressive layering technique used in accordance with this invention, there is a guarantee of hygienization of the stack since it is only imperative to observe the time intervals for the piling of the next stack. Thus, when a predetermined height is maintained for each layer, it is possible that during the retting process to absorb sufficient oxygen from the atmosphere to ensure correct retting, and this would not be possible, if, for example, an excessively high pile of refuse formed by a single piling or layering were effected. However, in keeping with this invention, the individual layers are not compacted as is the case of a single high pile and, thus, the pore volume is retained in the individually piled and in effect individually retted layers forming the overall stack. Thus, the pore volume retained on an individual layer basis can not be destroyed and a layer-by-layer retting is effected until the entire layered stack has been totally retted. Thus, the lowermost layer is left to stand subject to atmospheric conditions until it is stable enough, due to the resulting entanglement of the refuse thereof, for a subsequent layer to be built thereupon in the absence of a compacting of the first entangled, solidified, stable and porous first layer. Obviously, the underlying layer in which the retting process is taking place at a corresponding temperature may heat the overlying second layer, As a result, steam is yielded in the overlying layer. A considerable suction force develops from the bottom to the top accompanied by a upward high air lift or convection current through the layers. These phenomena are repeated as each new additional layer is piled upon a previously retted, entangled, solidified and self-supporting layer. By this means, several layers may be superimposed and a correct retting may safely take place.

Due to the process of the invention described, it is unnecessary to create horizontal cavities in or beneath the stacked refuse material which, with the piling of the refuse to about 5 meters and more, are required in known techniques to ensure the permanent oxygen demand for aerobic retting. The vertical flue-like vents are free of mountings when the layer of refuse is solidified by intertwisting so that the penetration of the entire stack with air, i.e., with the ambient oxygen is ensured for retting in about the same height and in a perfect manner. In countries with excessive rain and/or too intense sun radiation, it is suitable to perform composting or retting by having recourse to corresponding shields against such atmospheric conditions.

The heights of the piled layers of refuse are thus extended by this invention to about 1.20 meters to 1.50 meters, and a period of approximately 20 to 21 days is allowed for the entanglement, solidification and/or self-supporting created during the retting or composting operation. After the uppermost layer has been allowed to remain piled until it is sufficiently entangled, all layers may be immediately removed or cleaned off subsequently, particularly if the material is of a peat-type which can be used for combustion or might be enriched in a succeeding step with sewage sludge. However, the total stack may be subjected for an additional time to the retting process, e.g., for a further three months in order to obtain a completely hygienized aerobic product useful in agriculture.

Also in keeping with this invention, the height of the individual layers are lessened progressively from bottom toward top in a layer-to-layer fashion, and the graduation in this height reduction is dependent upon the consistency of the prepared refuse-sewage sludge mixture.

The air access to the lowermost layer of the eventually formed stack from below may be performed in various ways. For example, the first layer of the stack may rest upon an air filter bed provided on a horizontal apertured grid which is in turn supported above the ground or a similar supporting surface. The air filter bed may be formed of stack pieces of different sizes above a predetermined height. The natural air access to the air filter bed may be supported during the stacking operations by the supply of air of a slight excess pressure, e.g., of about 5 to 40 mm water column. It is important that with the beginning of the piling or layering and during the latter, a light air current may flow opposite to the following direction through the material so as to obtain a largepored volume during the layering and setting operation.

The access of air to the air filter bed during the heaping operation shall have a function similar to the fine bubble action during the biological water preparation. This effect can not be obtained any longer at a later moment after the heaping by aerating, blowing or absorbing. In this respect, the process is basically different from conventional known ventilation techniques.

The first layer is loosely piled to a height of 1–1.20 meters, and the mentioned air current acts against a compacting of the material so that the porosity is maintained to a far extent. Aerobic retting immediately starts and within two days the temperature in the whole layer rises to about 60°–70° C. After the fresh compost has become fungous by actinomycetes, a second layer of raw compost may be piled on in a height of about 1 meter so that after a complete penetration by fungi of the individual layers piled successively, the height of the total stack is 4.50 meters. The stack in this height is allowed to stand as it is, and the thermal lift resulting from the retting heat permits a continuous natural gas exchange by the ambient air. Thus, it is ensured that during the total retting time aerobic conditions prevail in the stack. Due to the great porosity and the setting technique, infiltration waters are excluded. Rains are absorbed by aspiration of the stack or they are retained by its water-retaining power.

According to a preferred method, a marginal zone roundabout the surface of the grid may be sealed airtightly; the airtight sealing should be achieved possibly at the internal side of the marginal zone to the ground surface so as to allow the formation of the required back pressure for the uniform distribution of the air oxygen. It is also possible to limit a predetermined central area of the grid surface by a wall erected roundabout, e.g., by plates or the like. Thus, the same back pressure is created. The additional air having a slight excess pressure is then supplied to the central free surface area of the lowermost layer. Generally, it will do if the air blast current is applied only during the first few days when the lowermost layer is piled up, and optionally, during the piling of the subsequent layer. An insulating action towards the ground is advantageously caused by the grid palettes and the air filter bed. The air filter bed, in particular a layer of very fine granulation, for which peat, dry compost or an air-permeable material on plastic base such as styropor or the like may be used is acting as a sufficient heat insulating layer.

The formation of the stack comprising several layers and the removal of material from the stack should be advantageously performed alternatingly at two adjacent sites, thus permitting a good utilization of the available space. Piling and removal from the stack should be performed conveniently in a closed course, e.g., in a circle or long oval way or the like and in the same sense of circulation. The removal from the pile may be delayed by at least three to four months from the setting of the layers. Thus, a continuous operation is ensured, while all available places are utilized. By employing the corresponding time intervals, piling of the corresponding first layer of the stack under formation may be performed directly successively in a predetermined number of places. Thereafter, the corresponding additional layers may be piled in a distributing manner. The removal of the stack may be performed correspondingly, layer after layer and distributed over the stack. When such working cycles are observed, a continuous operation is ensured, and sufficient space will be always available for setting the stack.

The device according to the invention is conveniently so designed that between two adjacent piled stacks or rows of piles, at least one movable crane is provided to set and remove the layers. To this effect, the usual crane equipment can be used. It would be advantageous to provide a tower guided on rails and having beams extending transversely relative to the runway, the beams being provided with conveyor means to supply or remove and carry away the material. By this means, the processed refuse material may be disposed on the one side of the shifting path of the crane to pile up in intervals a corresponding stack. On the other side of the crane, material already piled may be currently removed. Thus, the available space may be usefully utilized. The way of a closed circle, of a long oval space or the like for setting or removing the stack preferably comprises two rows arranged side-by-side with a crane path between said rows. To perform the continuous operation, two crane installations will generally do of which one crane is fitted for setting the layers, while the other is adapted for removing material from the stacks. The crane installations are operating in the same direction of movement.

In countries with excessive rains or very strong sun radiation, the whole site may be covered. To this effect, an open hangar is provided through which the wind may blow from all sides. During the critical months, as to atmospheric conditions, not covering the total year, it will generally do to provide a roof only for part of the available space. The working cycle may be so determined that during the critical period, i.e., for about three to four months, the formation of the stack to the entanglement of the uppermost layers will take place below the roof, and this will take three to four months during continuous operation, while the setting and removal of the material will take place during the remaining months of the year in a cycle on the circular or oval path out-of-doors. Thus, much roof coverage may be saved.

IN THE DRAWINGS

With the above and other objects in view that will hereinafter appear, the nature of the invention will be more clearly understood by reference to the following detailed description, the appended claims and the several views illustrated in the accompanying drawings.

FIG. 5 is a fragmentary cross-sectional view of an air filter bed, and illustrates coarse, medimum and fine grain piled atop the porous horizontal support, grid or pallet of FIGS. 1 through 4.

FIG. 6 is a schematic view of a preferred flue-like vent and illustrates the porous nature thereof and a removable cap at its upper end.

FIG. 7 is a schematic view of two different stacks with an aisle therebetween.

Figure 1:
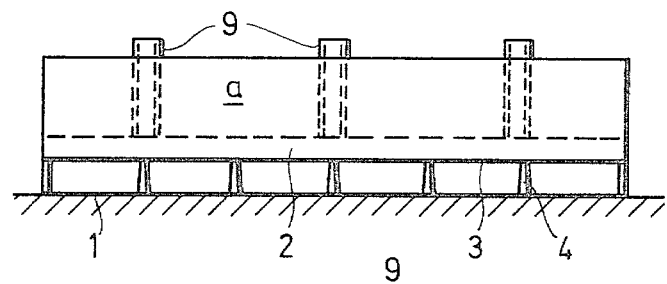
FIG. 1 is a schematic side elevational view illustrating a first layer of refuse supported upon a porous horizontal support which is in turn supported above ground such that air may flow upwardly through the refuse and through vertical ventilation tubes associated therewith.
Figure 2:
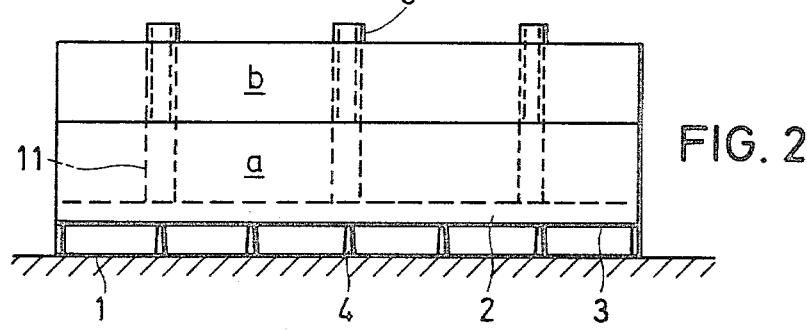
FIGS. 2 through 4 are similar schematic side elevational views and illustrate successive layers of refuse deposited one atop the other culminating in FIG. 4 in four superimposed layers.
Figure 3:
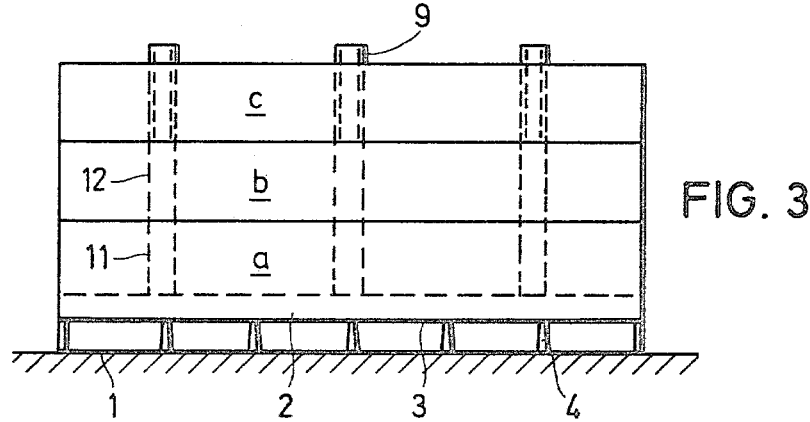

Reference is now made to FIGS. 1 through 5 of the drawings in which there is located at a supporting surface 1 a generally horizontal support 3 in the form of a porous or apertured grid, pallet or the like which is spaced above the supporting surface 1 by a plurality of supporting means 4 in the form of legs, tressels, blocks or the like. Supported atop the apertured or porous grid or pallet 3 is means 2 for defining a porous air filter bed through which air might flow after having first passed through the porous pallet 3. The porous air filter bed 2 includes a number of piles or layers of different granulation upon the uppermost layer or pile of which is deposited a layer 8 of fresh refuse material. Referring specifically to FIG. 5, a layer 5 of a predetermined height of coarse grain is deposited upon the porous grid or pallet 3 and a layer 6 of less porous grain than that of the layer 5 is piled atop the layer 5. The coarse grain 5 and the finer grain 6 may be, for instance, silica brick, slag, etc. Another layer 7 of still the finest grain possible is provided above and upon the layer 6. The finest layer 7 of grain may be, for example, peat, dry compost or the like. The height of the layer 6 is less than the heights of either of the layers 5 or 7, and the height of the layers 5 and 6 are substantially equal to each other. The fresh compost material 8 is, of course, placed immediately upon the uppermost finest layer 7. Thus, the air filter bed 2 is composed of the layers 5 through 7, although more than these three layers may be provided. The thicknesses of the different layers may be as follows: the coarse grain layer 5 is of a height of approximately 20 to 30 cm, the fine grain layer 6 is of a height of approximately 10 to 20 cm, and the finest grain layer 7 is of a height of approximately 30 cm. Due to the air filter bed 2, ambient air may flow from the area or gap (unnumbered) between the surface 1 and the porous pallet 3 through the latter upwardly through the air filter bed 2 in the layers 5 through 7 thereof and thence through the refuse 8, while at the same time achieving an insulating effect against the ground or surface 1.

Figure 4:
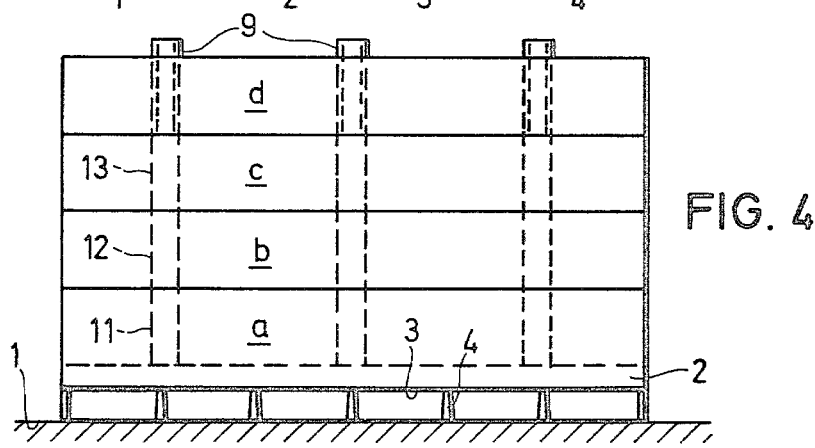

The height of the refuse 8 upon the air filter bed 2 is a loose height of the process refuse, as heretofore described, of approximately 1.20 meters to 1.50 meters. This layer is designated by reference numeral a in FIG. 1. In order to form flue-like cavities through the layer a from the bottom to the top thereof, a number of generally vertical perforated flue-like tubular pipes 9 are disposed in rows in offset relationship to each other, as is indicated by circular openings 14 (FIG. 12) formed in an uppermost layer after the pipes have been withdrawn therefrom. The purpose of the perforated pipes or flues is to obtain ventilation in an upward direction and preferably these pipes 9 may be formed as wire lattice tubes which, as to their heights, correspond to generally one of the layers a, b (FIG. 2), c (FIG. 3), and/or d (FIG. 4). The perforated pipes 9 may have at their upper end a removable cap 10 (FIG. 6). The mesh or size of the holes of the perforated pipes in the case of the wire lattice may be up to approximately 7 to 10 cm. If the flue-like ventilating pipes 9 are constructed from wire lattice, the same may be welded at its crossing points or crimped thereat, and during the layering (layers a through d), to be described hereinafter, the flue-like pipes 9 are progressively aligned one with the other above and below each other, as is most readily apparent in FIGS. 2 through 4 and 7 of the drawings.

Once the layer a (FIG. 1) is layered or piled upon the air filter bed 2, it is left as is for an undisturbed retting or composting period of time as, for example, approximately 20 to 21 days. After about 20 to 21 days, the layer a becomes fungous due to the continuous oxygen supply by upwardly circulating air and as a result of the microbial reaction process, the fungous state imparts to the total layer an internal support and a certain stability. Due to the corresponding processing of the refuse material, the layer a maintains a sufficient pore volume or porosity with a respiratory activity because of the aerobic retting process at a temperature at about 60° to 80° C.

After approximately the three weeks earlier noted, the layer 8 of the processed refuse material becomes stable, entangled and self-supporting by the retting process so that another layer b (FIG. 2) may be piled upon the layer a. The layer b is also of a height of approximately 1.20 meters to 1.50 meters at a maximum. The tubular flue-like venting pipes 9 earlier placed upon the air filter bed 2 and about which layer a was piled are removed, placed atop the layer a (FIG. 2), and the layer b piled thereabout. The pipes 9 are, of course, aligned with the tubular flues 11 formed in the layer a when the pipes 9 are extracted from the layer a. Due to the solidification of the layer a (FIG. 2), the flues 11 do not collapse and they are free of any internal supports, mountings or the like.

Upon the termination of the piled layer b, the latter is left as is for the proposed retting process, and self-ventilation for approximately three weeks, just as in the case of the layer a. The layer b is, of course, also heated from beneath by the layer a thus permitting the fermentation process of the overlying layer b. The other phenomena of the retting process described relative to the layer a are applicable to the layer b. Upon the termination of the retting process with respect to the layer b, the latter has also of such an internal support through entanglement that an additional layer c of process refuse material may be stacked or piled upon the layer b (FIG. 3) with the flue pipes 9 again being extracted from the layer b and placed in alignment with the openings 12 formed therein for the subsequent stacking thereabout of the layer c. Similarly, the layer c is also left in place for approximately three weeks to permit undisturbed areobic reaction until sufficient entanglement thereof occurs after approximately three weeks, whereupon the process is repeated with another layer d built upon the layer c in the same way as the proceeding layers a through c.

As soon as the uppermost layer d is sufficiently entangled and thus becomes internally self-supporting, the pipes 9 are extracted therefrom forming the flues 14 (FIG. 7), it being noted from the latter figure that all of the flues 11 through 14 of the respective layers a through d are in alignment, and such may be accomplished in adjoining stacks 15, 16 separated by an aisle or roadway 17 along which a crane installation may be moved, as will be more apparent hereinafter.

The maturation of the stacks 15, 16 (FIG. 7) therefor takes approximately 12 weeks (4 stacks × 3 weeks) and when accomplished in this layer-by-layer manner, there is no danger of forming anaerobic areas in any of the layers a through d or the overall entire stack (a through d). If a stack of the height of a through d is left as it is for an additional period of six weeks when a continuous gas exchange is possible due to the upward convection resulting from the fermentation heat, while the product must not be moved nor is it necessary to care for a forced-air supply by means of fans or the like, the resulting final product is completely hygienized and fully storable. However, after three weeks lapse with respect to the uppermost layer d, the stack may be removed. The entire stack is then of a peat-like quality and may be used, for example, for heating.

Figure 8:
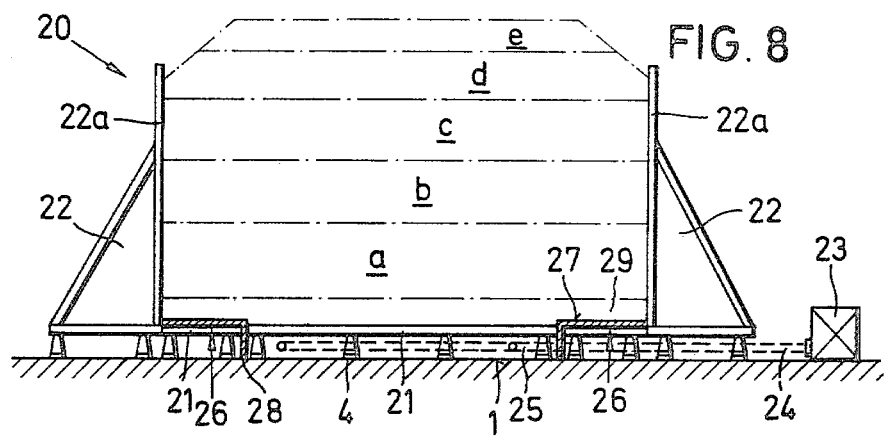
FIG. 8 is a schematic cross-sectional view of another embodiment of a stack to form the retting process of this invention, and illustrates the manner in which superatmospheric air is directed to a localized central portion of a porous horizontal support.
Figure 9:
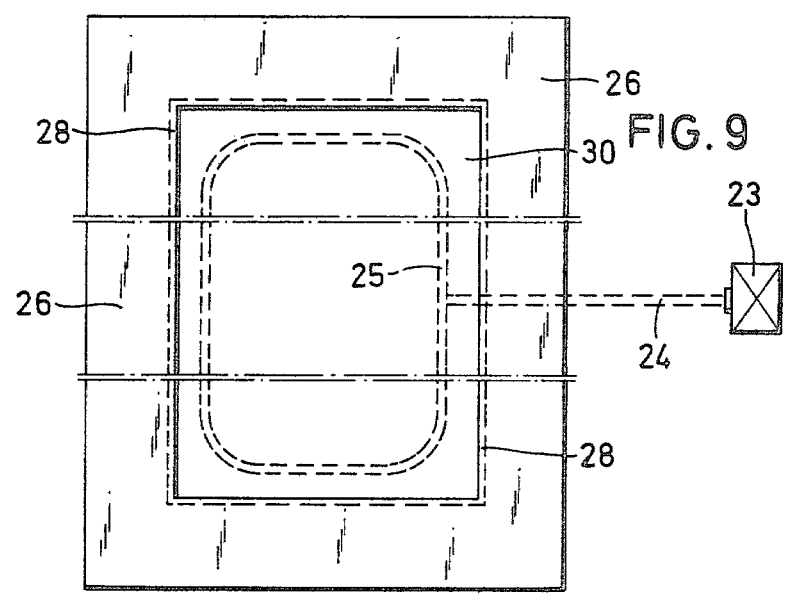
FIG. 9 is a top plan view of the stack of FIG. 8, and illustrates a cover bordering a margin of the porous horizontal support and the manner in which superatmospheric air is distributed from a generally closed loop manifold.

Reference is now made to FIGS. 8 and 9 of the drawings which illustrate and apparatus 20 including a generally horizontal support, such as an air-permeable, porous or apertured horizontal support or pallet 21 again supported upon tressels or feet 4. The apparatus 20 is designed to have slight excess pressure (superatmospheric) supplied beneath the underside of the pallet 21 at a generally centrally localized region or zone thereof, as will be more apparent hereinafter. The pallet 21 is provided around lateral or marginal edges thereof with upstanding air permeable walls 22a made from wire netting or the like, and these are supported by lateral inclined supports 22. Slight superatmospheric pressure is supplied to the underside of the porous or apertured pallet 21 from a conventional blower or fan 23 connected to a conduit 24 which is in turn connected to an annular conduit 25 having a plurality of upwardly directed openings (not shown). A marginal zone, generally designated by the reference numeral 26, bounds an inner generally rectangular central zone 30 of the pallet 21 with the apertures (not shown) and a central zone of the pallet 21 being exposed and those in the marginal zone 26 being closed by a cover or sheet 27 of plastic which along an inboardmost edge is provided with a downwardly directed leg or collar 28 which rests upon the ground or supporting surface 1 outboard of the apertured annular conduit 25. Thus, the cover 27 and its leg 28 confine the air emitted from the apertures of the annular conduit 25 to the generally central rectangular zone 30 of the apertured pallet 21 and the air rises upwardly therethrough and through the various layers a through e of refuse piled thereupon (FIG. 8). Before piling the layers (a through e) upon the pallet 21, an insulating layer 29 which is not conductive as to temperature and is constructed much in the manner of the air filter bed 2 of FIG. 5 is placed atop the central area or zone 30 of the aperture pallet 21. Preferably, the insulating layer or air filter bed extends over the entire area of the pallet 21 or, stated otherwise, fills the entire area bounded by the walls 22a. Once the air filter bed 29 has been placed upon the pallet 21, the layer a of a uniform height is piled thereupon and, though not illustrated, flue-like pipes corresponding to the pipes 9 of FIGS. 1 through 4 and 6 might be utilized in this arrangement. Thereafter, it is obviously advantageous to pile the eventual stack with a plurality of added layers b through e, each being of a decreasing height such that the lowermost layer a ranges between 1.50 meters to 2 meters, while the uppermost layer e is only approximately 50 cm in height. The intermediate layers b through d are correspondingly stepped in height with the graduations in the reduction of the height of the layers a through e from bottom to top being dictated by the type of process refuse material being utilized, e.g., by its more or less dry and airy or fine-grained and compact condition. The utilization of the sealed marginal zone 26 causes an extremely uniform distribution and spreading of air or oxygen penetrated into the layers a through e over the entire surface of the length and width of the pallet 21 and sufficient air may flow outwardly to the lateral surfaces of the stack or layers a through e to uniformly effect the retting thereof. In other words, the system or apparatus 20 ensures uniform retting heat within and throughout the various layers a through e of the total stack formed thereby.

Figure 10:
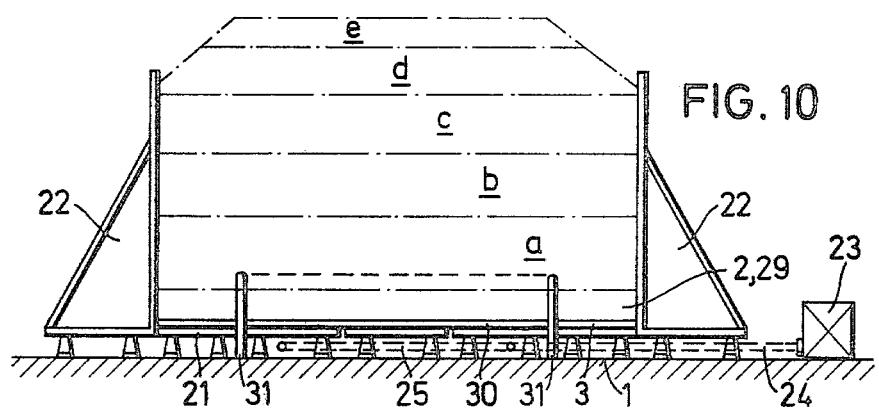
FIG. 10 illustrates another embodiment of the invention including a tubular wall which localizes superatmospheric air centrally of refuse layered atop a horizontal pallet.

Turning specifically to the structure of FIG. 10, the same includes a porous horizontal support or pallet 21 and a central area or zone thereof is provided with superatmospheric air from a blower or fan 23 through a conduit 24 and an annular conduit 25 having upwardly directed apertures (not shown), just as in the manner of the latter structure better illustrated in FIG. 9. The difference between the apparatus of FIGS. 8 and 9 and that of FIG. 10 is that in the latter, a central area 30 of the pallet 21 which confines the superatmospheric air pressure thereto is created by an upstanding generally annular wall 31 which projects from the pallet 21 downwardly to the supporting surface 1 and upwardly into and through the insulating layer or air filter bed 2, 29. The distance of the wall 31 from the outermost edge or side of the pallet 21 is approximately one-fifth of the total width of the pallet 21, just as in the case of the sealed marginal zone or cover 27 of the embodiment of the invention of FIGS. 8 and 9.

Referring now to FIGS. 11 to 14, the available space for performing retting operations in accordance with the present invention may be so organized that the air filter beds 2, 29 of a specific size are arranged to form two adjacent stacks 15, 16 (FIG. 11) with an aisle, corridor or roadway 17 therebetween thus permitting layers a through d to be built up successively on one side of the aisle 17, while fully retted layers d through a can be so removed from the opposite side of the aisle or roadway 17.

Figure 11:
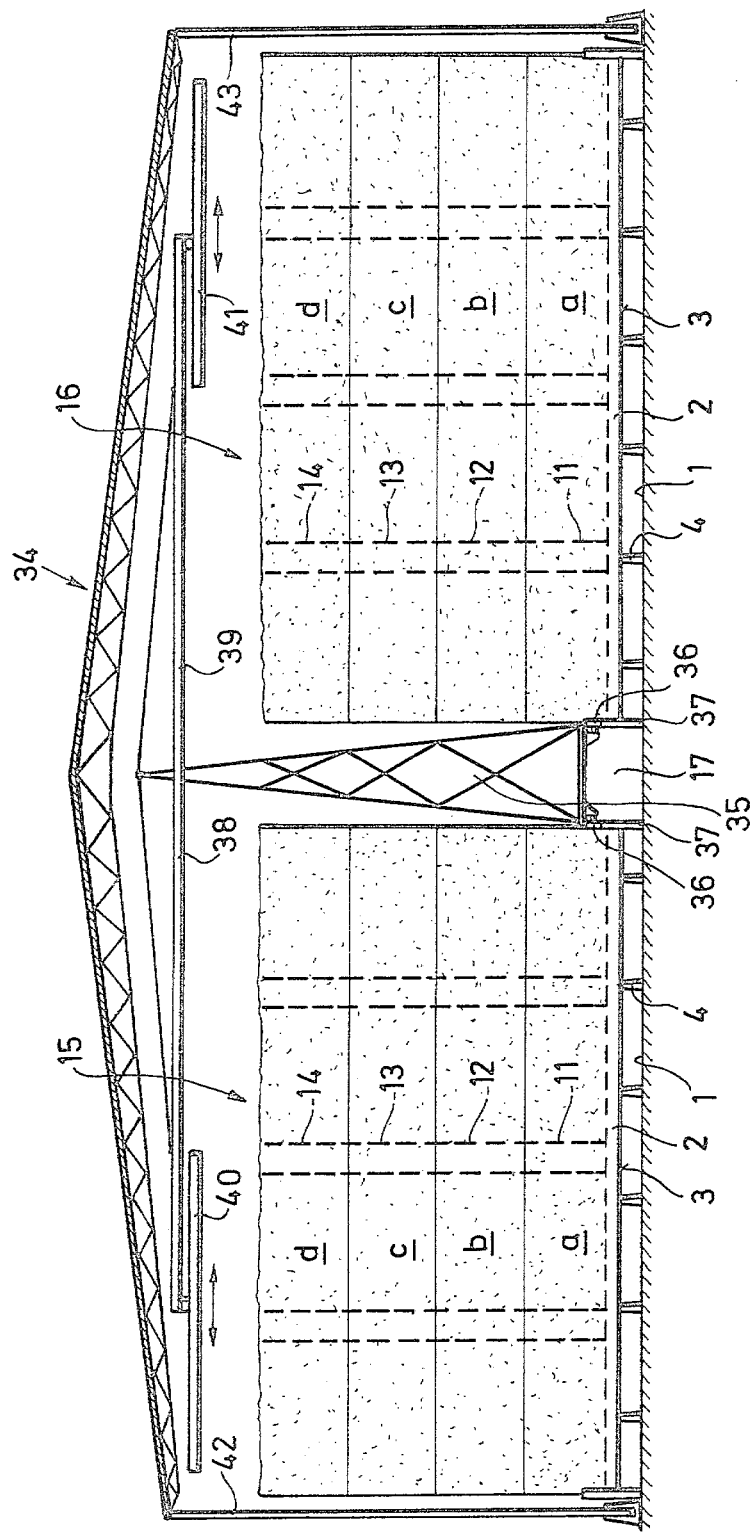
FIG. 11 is a schematic plan view of another arrangement, and illustrates two different stacks with a crane therebetween for adding or layering material to or removing material from the stacks.
Figure 12:
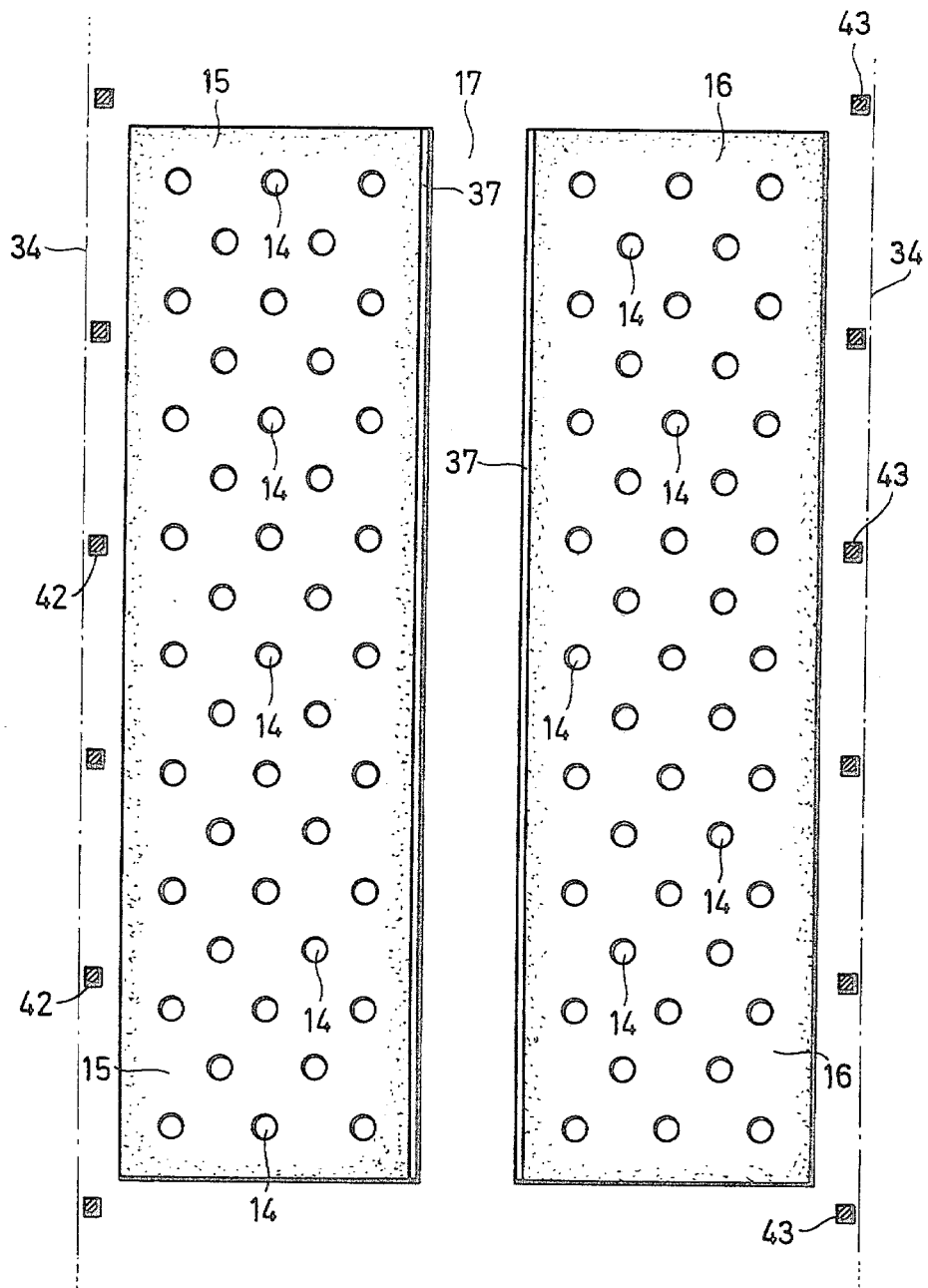
FIG. 12 is a view looking downwardly in FIG. 11, and illustrates an aisle between the stacks in which a crane may be moved.

As is best illustrated in FIGS. 11 and 12, the stacks of layers a through d might be located beneath a common roof 34 supported by pillars or posts 42, 43 and with the exception of the elements 34, 42 and 43, the stacks 15, 16 are otherwise fully open to atmosphere. Means in the form of a crane 35 is movably supported in the corridor 17 upon rails 37 by means of wheels 36 for moving along the roadway, corridor or aisle 17 to pile the refuse upon the various pallets or unpile the retted material therefrom. The crane 35 is provided bi-laterally with jibs 38, 39 which may include conventional conveyor belt systems. Portable conveyor belt systems 40, 41 may also be arranged at the ends of the jibs 38, 39 and by means of a generally inclined conveyor belt (not shown), the refuse may be supplied to or the retted or composted material removed from the cranes along the corridor 17 to and from the conveyor belt systems of the jibs 38, 39.

Figure 13:
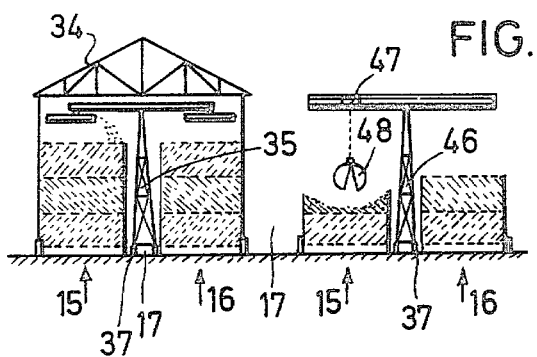
FIGS. 13 and 14 illustrate respective schematic sectional and top plan views of an arrangement for the continuous operation of a layering and removing system in accordance with the present invention.
Figure 14:
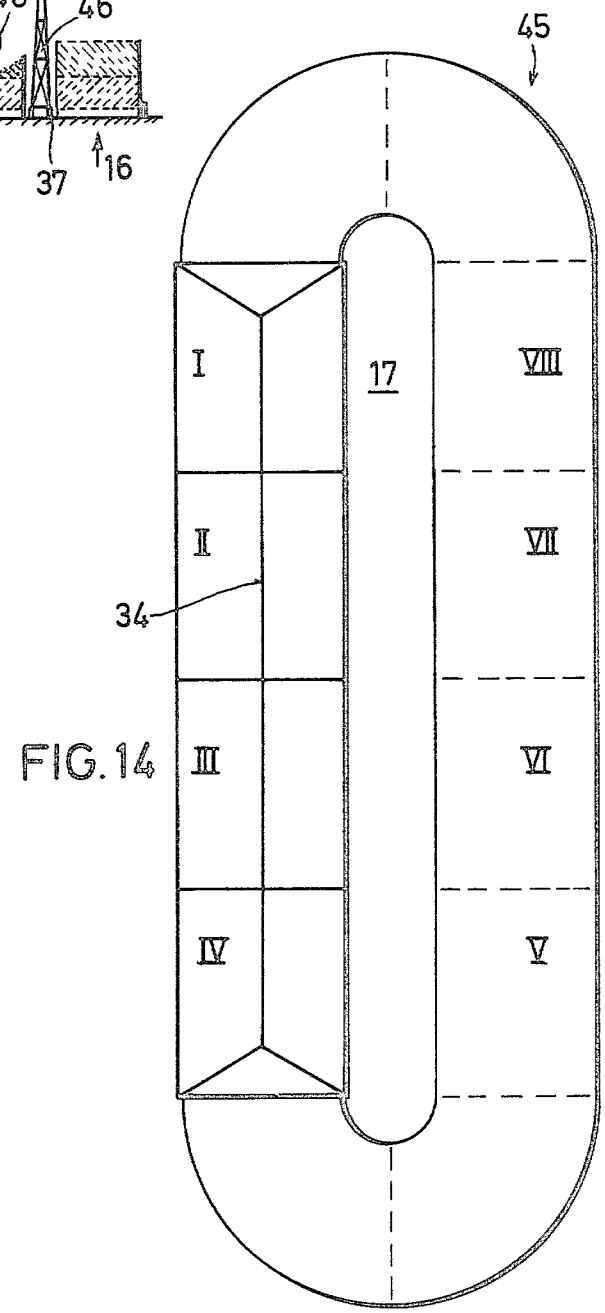

Insofar as FIGS. 13 and 14 are concerned, these illustrate another example for a continous operation in piling and removing the layers from associated pallets or stacks. FIG. 14 illustrates a relatively long closed oval shape 45 having eight areas or fields I through VIII. Each field I through VIII is made up in the manner shown in FIG. 12 comprising two stacks or rows of stacks 15, 16 and a corridor or roadway 17 therebetween having mounted for movement along rails in the corridors cranes 35 and 46 (FIG. 13). The crane 35 might be utilized to form many of the piles or layers a through e, whereas the crane 46 may simultaneously be utilized to remove the compost from the layers e through a after the retting period of three to four months has been performed. Either of the cranes might, for example, include a trolley 47 with a clamp-shell grab 48 or, in lieu thereof, with a bucket conveyor or a milling roll. The cranes 35 and 36 move on the same type rail 37 as those shown earlier, and these are also displaced in a generally oval configuration such that there is an oval closed loop of stacks or layers and their associated pallets inboard and outboard of the rails 37 and the cranes 35 and/or 46 associated therewith.

In the system of FIGS. 13 and 14, a stack is conveniently made by first forming a lowermost layer a beginning with the field or area I. Layers b, c, d, and/or e are then set subsequently in corresponding periods of time beginning with field I until the stacks are complete. This may be performed in a weekly cycle so that the first four fields I through IV are filled up after the sixteenth week. In the meantime, the uppermost layer of field I is mature to be used as heating material so that from the seventeenth week the compost may be removed from the first field by means of the second crane 46 which follows the first crane at a time interval of about three to four months. Thus, a continuous operation round about the long oval shape 45 may be carried out without the inclusion of down times. In other words, while fields I through IV are filled with the corresponding layers to form the stacks in a certain time cycle, the fields V through VIII are removed during the same time interval. If the removal of material in the field I is imminent, fields V through VII are filled with processed refuse for the formation of stacks and the subsequent retting thereof. By a corresponding organization of the working cycle, it is possible that only specific fields must be under roof for the setting, retting and maturing of refuse or waste material, e.g., during the winter while the setting and removing of other fields may be performed out-of-doors. Hence, it might do for the fields I through IV to be under a roof 34 (FIG. 14) if the time of setting and maturation is such as to just fall in the noted critical winter months. The other fields V through VIII may not necessarily have to be under roof during the remaining spring, summer and fall cycles of the year. Two crane installations may be sufficient to this effect, i.e., one for filling and the other for removing the material.

To this effect, the cranes are timed to move about the oval 45 such that the fields I through VIII may be kept free successively for a certain time to clean them within the working cycle and to check the pallets, the air filter beds, etc. in the event renewal and/or replacement might be required. In this manner, the continuous working cycle during the year need not be interrupted in any fashion.

Although only a preferred embodiment of the invention has been specifically illustrated and described herein, it is to be understood that minor variations may be made in the apparatus without departing from the spirit and scope of the invention, as defined in the appended claims.

What is claimed is:

1. A process of composting by thermal retting comprising the steps of piling refuse to form a first layer of a predetermined generally uniform height, maintaining an area below the first layer which is accessible to atmosphere, forming generally vertical flue-like vents in the first layer extending between the area below the first layer and an upper surface of the first layer, maintaining the first layer under conditions sufficient for thermally retting the material of the first layer for a predetermined period of time until the material has generally solidified and become self-supporting through retting and entanglement of the retted refuse, thereafter forming a second layer of a predetermined generally uniform height atop the first layer, forming generally vertical flue-like vents in the second layer in fluid communication with the flue-like vents of the first layer, maintaining the second layer under conditions sufficient for thermally retting the material of the second layer for a predetermined period of time until the same has generally solidified and become self-supporting through retting and entanglement of the retted refuse, forming additional layers by performing the steps and under the conditions recited for forming said second layer such that a stack of numerous layers of eventually completely retted refuse is formed with the height of the stack corresponding to the combined layer heights, and removing the stack or portions thereof for further utilization only after the uppermost layer has become completely solidified and self-supporting through entanglement of its completely retted refuse.

2. The process as defined in claim 1 wherein the height of any one of the layers is substantially of a height up to 1.20–1.50 meters, and the predetermined period of time per layer before adding the next layer is approximately three weeks.

3. The process as defined in claim 1 wherein the height of an uppermost layer of the stack is less than the height of a lowermost layer of the stack.

4. The process as defined in claim 1 including the step of supplying superatmospheric air to the area beneath the first layer.

5. The process as defined in claim 1 including the step of supplying superatmospheric air to the area beneath the first layer, and confining the superatmospheric air to a central area beneath the first layer.

6. The process as defined in claim 5 wherein the confining step is performed covering an area of a lower surface of the first layer outboard of the central area.

7. The process as defined in claim 5 wherein the confining step is performed by forming a generally impermeable tubular chamber bounding the central area into which the superatmospheric air is supplied.

8. The process as defined in claim 1 including repeating said first-mentioned steps alternately with the performance of said first-mentioned steps to form another stack adjacent the first stack.

9. The process as defined in claim 1 wherein the flue-like vents of the first layer are formed utilizing tubular elements, and the flue-like vents of the second layer are formed by extracting the tubular elements from the first layer and utilizing the same in the formation of the second layer.

10. The process as defined in claim 9 wherein the tubular elements are utilized by axially aligning the same with the flue-like vents of the first layer.

11. The process as defined in claim 2 wherein the height of an uppermost layer of the stack is less than the height of a lowermost layer of the stack.

12. The process as defined in claim 2 including the step of supplying superatmospheric air to the area beneath the first layer.

13. The process as defined in claim 2 including the step of supplying superatmospheric air to the area beneath the first layer, and confining the superatmospheric air to a central area beneath the first layer.

14. The process as defined in claim 3 including the step of supplying superatmospheric air to the area beneath the first layer.

15. The process as defined in claim 3 including the step of supplying superatmospheric air to the area beneath the first layer, and confining the superatmospheric air to a central area beneath the first layer.

16. The process as defined in claim 8 wherein the first stack, another stack and further stacks are repetitively formed and removed along a continuous unending path.

17. The process as defined in claim 8 wherein the first stack, another stack and further stacks are repetitively formed and removed along a continuous unending path, and the removing steps follow the forming steps in the same direction of movement along the continuous unending path.

18. The process as defined in claim 8 wherein the step of removing the stack is performed by removing layers therefrom layer-by-layer inversely to the formation thereof.

19. The process as defined in claim 1 including the step of forming a plurality of layers of differently granulated material, and performing the first-mentioned piling step upon an uppermost of the layers of granulated material.

20. The process as defined in claim 1 including the step of forming a plurality of layers of differently granulated material, performing the first-mentioned piling step upon an uppermost of the layers of granulated material, and granulation of the plurality of granulated layers being such that the porosity of the layers decreases in succeeding superposed layers.

21. The process as defined in claim 1 including repeating said first-mentioned steps to form another stack adjacent the first stack, and removing one layer from the first formed stack alternately with piling a layer to form the another stack.

22. The process as defined in claim 21 wherein the first stack and the another stack are formed along and in part define a continuous unending path.

23. The process as defined in claim 21 wherein the first stack and the another stack are formed along and in part define two generally spaced parallel side-by-side paths.

* * * * *

UNITED STATES PATENT AND TRADEMARK OFFICE
CERTIFICATE OF CORRECTION

PATENT NO. : 4,317,671
DATED : March 2, 1982
INVENTOR(S) : Hannes Willisch

It is certified that error appears in the above-identified patent and that said Letters Patent is hereby corrected as shown below:

On the Title page Item [73] Assignee should read as follows;

--Von Roll AG, Gerlafingen/Schweiz, Fed. Rep. of Germany part interest.--.

Signed and Sealed this

Thirteenth Day of July 1982

[SEAL]

Attest:

Attesting Officer

GERALD J. MOSSINGHOFF

Commissioner of Patents and Trademarks